Patented May 14, 1935

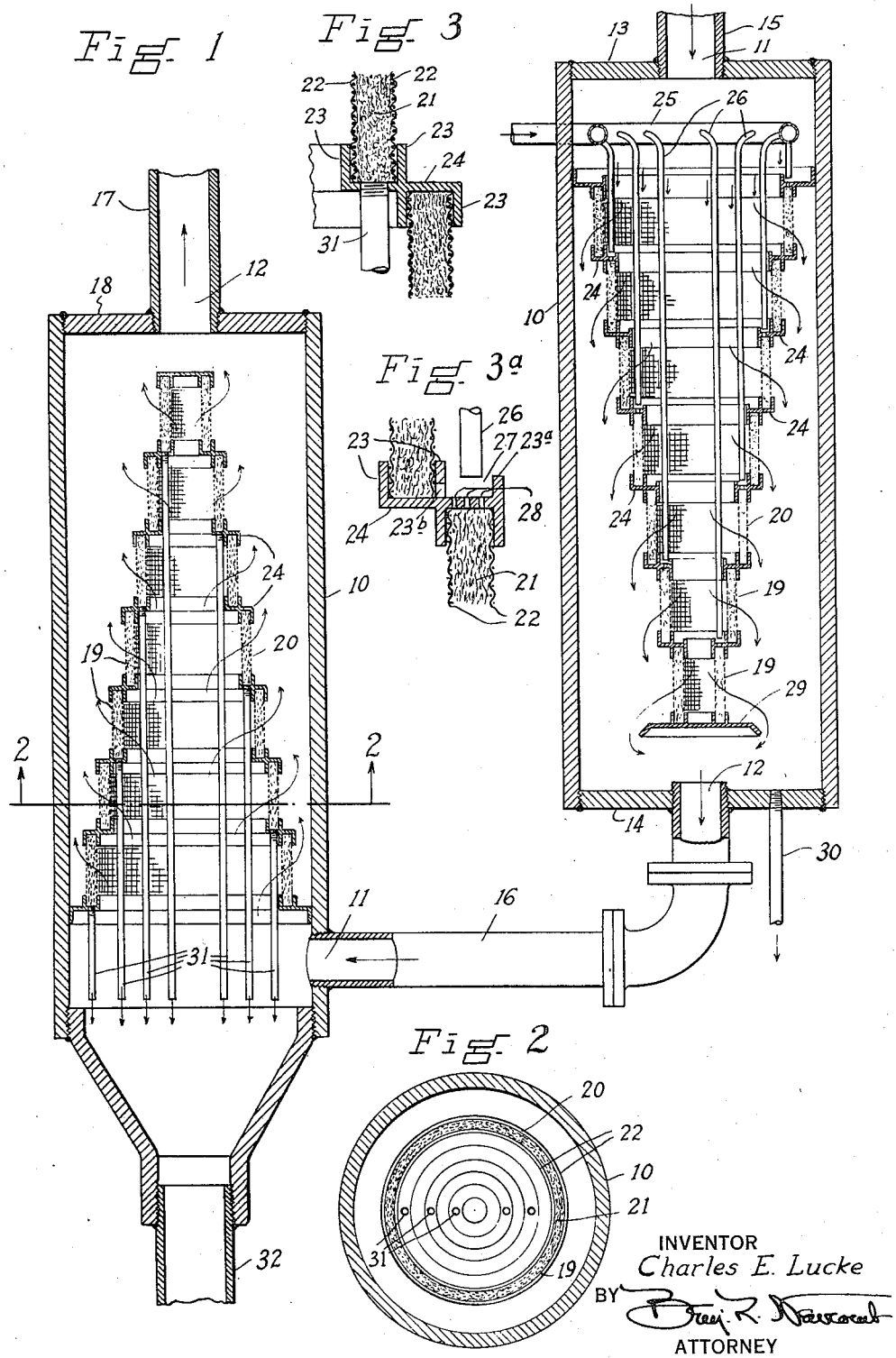

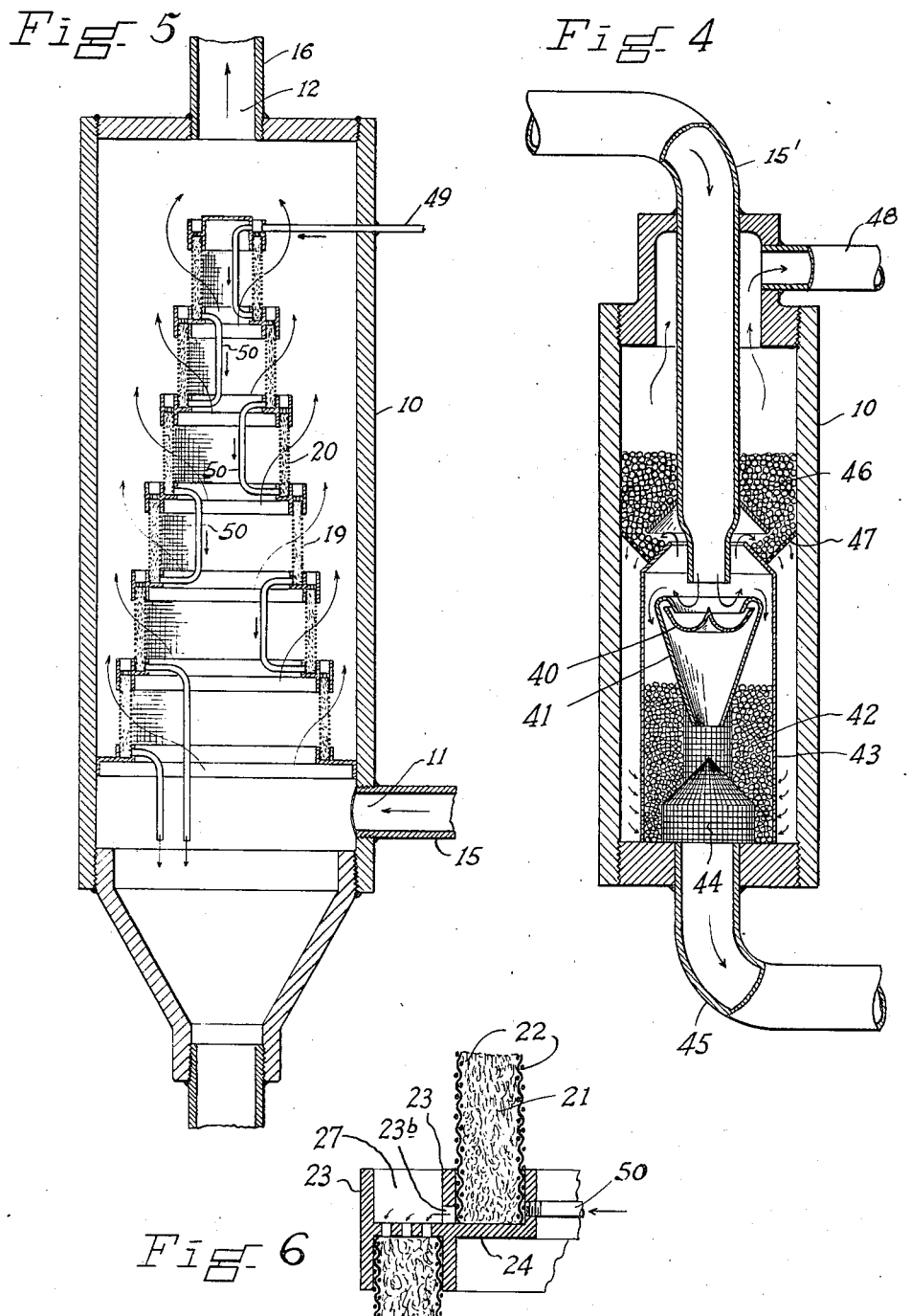

2,001,259

UNITED STATES PATENT OFFICE 2,001,259

METHOD OF AND APPARATUS FOR CONDITIONING GAS OR VAPOR

Charles E. Lucke, New York, N. Y., assignor to The Babcock & Wilcox Company, Newark, N. J., a corporation of New Jersey Application December 2, 1933, Serial No. 700,673

9 Claims. (Cl. 183—9)

The present invention relates in general to a method of and apparatus for conditioning gases and vapors, and more particularly to conditioning by the addition to a gas or vapor of a conditioning liquid in a finely divided form or of a vapor and separation from a carrier gas or vapor of liquid in a finely divided form. My invention is especially adapted for liquid and gas separation where inertia separation is ineffective or impossible, such as the separation of moisture from high pressure wet steam; for gas or vapor cooling, such as the desuperheating of superheated steam; for humidification or carburetion of gas or vapor; and for the purification of wet gas or vapor carrying solid impurities in solution in the suspended liquid particles.

The general object of my invention is the provision of an improved method of and apparatus for conditioning gas or vapor characterized by the effectiveness of the conditioning method and the simplicity, relatively low cost of construction and operation of the apparatus employed, and its especial utility for high pressure use.

In accordance with my invention, the gas or vapor to be conditioned is passed through a conditioning chamber containing a multiplicity of closely spaced solid surfaces disposed directly across the path of gas flow and having a gas flow area therebetween sufficient to insure a relatively low gas velocity and yet intimate contact between all portions of the gas stream and the obstructing solid surfaces. During the passage of the gas, films of liquid form on the solid surfaces, either by the separation of suspended liquid particles when a wet gas is being conditioned, or by supplying a conditioning liquid so as to continuously wet the solid surfaces in the path of the gas. The liquid films formed flow downwardly by gravity over the solid surfaces and collect and are removed at the lower level of the material, while the conditioned gas in a homogeneous condition passes out of the conditioning chamber.

When my invention is embodied in a liquid and gas separation system, such as the separation of suspended moisture from wet steam, the wet steam is passed through a perforate mass of moisture separating material. The stream of wet steam is thereby subdivided into a multiplicity of small streams, each of which passes around or between the solid surfaces in a flow path proportioned to cause each suspended particle of moisture to contact at a relatively low velocity with a solid surface and adhere thereto. The accumulation of moisture particles on the solid surfaces forms films thereon, which flow downwardly through the mass of material. A relatively short vertical flow path for the films is provided to limit their thickness, which with the steam flow area through the mass proportioned to provide a relatively low steam velocity and particularly a low steam exit velocity, prevents any separated water in film form being displaced and swept up by the flowing steam. The degree of contact of the steam with the downflowing water film is minimized by causing the steam to flow through the mass of material in a direction other than vertically downward. The separated water is withdrawn at the lower level of the material and is removed from the conditioning chamber through a flow path entirely separate from the steam flow path. With this arrangement, the steam may be withdrawn in a uniform dry condition.

When the invention is embodied in a gas or vapor cooling system, such as for desuperheating superheated steam, the superheated steam is passed as described above through the perforate mass of solid material in the conditioning chamber, and during its passage therethrough brought into intimate contact with films of liquid on the solid surfaces throughout the height of the mass formed by supplying liquid in sufficient quantities to the upper level of the mass and allowing the same to flow downwardly therethrough and discharge at the bottom thereof. Some of the liquid will be evaporated by the heat transfer between the liquid and the contacted superheated steam, cooling the latter. The steam so generated mixes with the cooled superheated steam to provide a uniform temperature and homogeneous condition for the steam passing out of the conditioning chamber. The steam flow area is proportioned to provide a steam velocity through the mass sufficiently low to avoid displacing and spraying of the liquid films as the steam leaves the mass and thus insures that no unevaporated liquid will be present in the exit steam. If the unit is operated beyond its capacity, a second conditioning unit may be arranged in series to separate any liquid present in the gas stream. The unevaporated liquid accumulates at the lower level of the mass and is removed at that point separately from the path of steam flow. By using relatively warm water the system may be used for air humidification, while the supplying of cold water will effect air dehumidification.

When the invention is embodied in a gas or vapor purification system, such as for reducing the solid concentration of wet steam where the reduction obtainable by a separating action is insufficient, or the apparatus operated with high steam velocities, the wet steam containing the solid impurities in solution in the suspended moisture is passed through the conditioning chamber and during its passage through the perforate mass of material is brought into contact with downflowing films of water, such as feed water for the steam generator, having a solid concentration substantially lower than the solid concentration of the suspended moisture. The moisture in suspension is separated and mixed with the pure water in the films and thereby any moisture carried out of the unit by the steam will have a substantially reduced solid concentration, and, after a subsequent moisture separating action, the total number of solids in the conditioned steam will be negligible.

The various features of novelty which characterize my invention are pointed out with particularity in the claims hereof, in which "gas" is used to generically cover any gas or vapor. For a better understanding of the invention, its operating advantages and specific objects attained by its use, reference should be had to the accompanying drawings and descriptive matter in which I have illustrated and described preferred embodiments of my invention.

Of the drawings:

Fig. 1 is a sectional elevation of conditioning apparatus comprising two conditioning units arranged in series;

Fig. 2 is a section on the line 2—2 of Fig. 1;

Fig. 3 is an enlarged view of a portion of one of the units shown in Fig. 1;

Fig. 3A is an enlarged view of a portion of the other unit shown in Fig. 1;

Fig. 4 is a sectional elevation of a modified form of conditioning unit;

Fig. 5 is a sectional elevation illustrating a second modification; and

Fig. 6 is an enlarged view of a portion of the unit shown in Fig. 5.

The conditioning apparatus illustrated in Figs. 1–3A comprises two substantially similar conditioning units arranged in series and while constructed on fundamentally the same principles, differ in details. Both units have a cylindrical casing 10 forming the conditioning chamber having an inlet opening 11 at one end for the gas or vapor to be conditioned and an outlet opening 12 at the other end for the conditioned gas or vapor. The first unit shown at the right in Fig. 1 has top and bottom plates 13 and 14 in which the openings 11 and 12 are respectively formed. A pipe 15 conducts the gas to be conditioned to the inlet opening 11 and a pipe 16 connects the outlet opening 12 of the first unit to the inlet opening 11 of the second unit shown at the left of Fig. 1. An outlet pipe 17 conveys the conditioned gas leaving the second unit through the outlet opening 12 in the top plate 18 thereof. In both units, the gas or vapor is conditioned by its passage through a perforate mass of solid material under suitable conditions. The solid material is preferably arranged in the form of ring sections 19 symmetrically arranged in the casing 10 and successively decreasing in diameter in the direction of gas flow through the casing to form a substantially conoidal member 20 through the perforate wall of which the gas must pass before reaching the outlet 12. Each ring section is preferably formed by an annular mass of granular or fibrous material 21 held between vertical perforate circular walls 22, of wires straight or woven into mesh or perforate plates, positioned between pairs of circular vertical flanges 23 formed on opposite sides of horizontally arranged ring plates 24 spaced at relatively short distances vertically of the casing 10. The form and construction of the unit is thus especially adapted for high pressure use.

The conditioning apparatus shown in Figs. 1–3A may be advantageously used for adding a conditioning vapor to the gas in the first unit and separating any remaining suspended liquid particles in the second unit, such as occurs in reducing the concentration of solid impurities in the suspended moisture of wet steam. For such use, the first unit is shown as constructed with the conoidal member 20 inverted and the ring plates 24 of special construction. In addition, conditioning liquid in the form of water, such as feed water for the generator in which the steam was generated, having a lower solid concentration than the moisture suspended in the steam, is supplied to the ring sections in amounts insuring the formation of downwardly flowing water films of a suitable thickness on the surfaces of the solid material in the ring sections throughout their height. In this unit, as shown in Figs. 1 and 3A, the ring plates 24 have an additional inner upper flange 23$^a$ and the intermediate upper flange is formed with bottom openings 23$^b$ to insure a flow to each lower section of a limited amount of excess water in the superadjacent section. Each ring section is separately supplied with conditioning water through a circular manifold 25 and pipes 26 connected thereto and opening to the circular trough 27 formed by the intermediate flange 23 and inner flange 23$^a$. Holes 28 formed in the ring plate provide communication between each trough 27 and the subjacent ring section. The limited height and separate supply of conditioning liquid to each section limits the film thickness and liquid sprayed at the discharge side.

The wet steam to be conditioned passes downwardly from the inlet 11 to the conoidal member 20 and outwardly through the successive ring sections. The steam passes in intimate contact with the films of conditioning water, the suspended moisture being separated and combining with the pure water. Any moisture suspended in the steam passing out of the conoidal member 20 due to too high an exit velocity will thus have a considerably less solid concentration than the moisture in the entering steam. The steam so partly conditioned passes out through the opening 12 in the lower end of the casing 10 and through the pipe 16 to the second conditioning unit. The excess liquid supplied and separated collects in the bottom of the lowermost ring section and overflows into the bottom of the casing 10. The overflowing moisture is prevented from dropping into the upper projecting end of the pipe 16 by means of a deflecting baffle 29 secured to the lower end of the lowermost ring section. The moisture collecting in the bottom of the casing 10 is withdrawn through a drain connection 30.

In the second or separating unit, the conditioning liquid supply system is omitted and the wet steam entering through the opening 11 passes upwardly in the interior of the conoidal member 20 and outwardly through the successive ring sections, the ring plates and sections being constructed substantially as shown in Fig. 3. The intimate contact between the moisture particles and the solid surfaces in the steam flow path causes water films to form on the solid material and flow downwardly to the bottom of each ring section. Drain pipes 31 separately connect the bottom of each ring section to the casing space below the inlet opening 11, from which space the collected liquid is withdrawn through a pipe 32. The relatively small vertical height and separate draining of each section substantially adds to the effectiveness of the operation. The purified and dry steam passes out of the casing upper end through the pipe 17. The second unit is especially useful for high capacity operation, and may be omitted for low capacity operation.

The conditioning unit shown at the left of Fig. 1 is especially adapted for the separation of liquid from a gas or vapor under conditions where inertia separation is ineffective or impossible because of the small difference in densities of the liquid and gas, the small size of the liquid particles, or the inability to provide the abrupt changes in direction of streams of small enough size required for effective inertia separation, such as the drying of steam at pressures approaching the critical pressure of steam. The unit is also adapted for use as a gas humidifier or dehumidifier by supplying a suitable conditioning liquid, as described above.

In Fig. 4 is illustrated a modified conditioning unit adapted for liquid and gas separation, wherein the wet gas enters through an inlet pipe 15' having its lower end nozzle-shaped and discharging intermediate the height of the casing 10. Instead of a single stage of liquid separation by adhesion, as in the separating unit of Fig. 1, the wet gas is subjected to an initial inertia stage of separation to remove slugs of liquid or coarse liquid drops in a well known manner and then to one or more stages of separation by adhesion in accordance with my invention to remove the fine suspended liquid particles. The wet gas discharges against a horizontally arranged flow reversing member 40 formed by a surface of revolution which gives a circulatory movement to the gas and liquid impinging thereon. The liquid separated by inertia being denser than the gas, hugs the surface of the member 40 and together with any gas mixed therewith passes outwardly into the inwardly curved upper end of a second flow reversing member 41 of conical shape, in which it is directed downwardly into the lower part of a porous mass of granular solid matter 42, preferably in the form of metal balls, positioned in an inner casing 43, enclosing and spaced from the flow reversing cone 41. The liquid particles in the gas collect on the surface of the balls in the form of films and flow downwardly by gravity to the bottom of the casing 43, and thence through a grid 44 over a bottom discharge pipe 45. The grid prevents the balls from entering the discharge pipe, but permits the passage of separated liquid. The gas passes upwardly out of the mass of balls and around the outer side of the cone 41 where it joins the gas separated by the initial impinging action on the member 40. The gas then flows upwardly around the conical upper end of the casing 43 through an upper mass of balls 46, and any liquid remaining suspended in the gas is separated by adhesion to the surfaces of the balls and drains downwardly through a perforated inclined ring plate 47 extending between the inner and outer casings. The lower end of the inner casing 43 is also perforated to permit the passage of the liquid separated in the upper section to the outlet pipe 45. The dry gas passes upwardly in the casing 10 to a discharge pipe 48 opening through the casing head. By adding conditioning liquid supply means to one or both perforate masses of material, the unit may be used for the other conditioning processes described.

In Fig. 5 is illustrated a modified conditioning unit which may be used in lieu of the construction shown for the first or washing unit shown in Fig. 1. In Fig. 5, the conoidal member 20 is upright and the conditioning liquid is wholly supplied to the uppermost ring plate 24 through a pipe 49. Pipes 50 are provided connecting the bottom of each ring section with the bottom of the subjacent section and openings 23$^b$ formed in each intermediate flange 23 for the passage of conditioning liquid therethrough into the trough 27 formed between the intermediate and outer upper flanges 23. A head of liquid is thus provided sufficient to adequately supply each ring section with conditioning liquid through the ring plate openings 28$^b$ and the excess liquid is by-passed through the pipes 50 and finally discharged into the bottom of the casing below the gas inlet pipe.

While in accordance with the provisions of the statutes I have illustrated and described herein the best forms of my invention now known to me, those skilled in the art will understand that changes may be made in the forms of the apparatus disclosed without departing from the spirit of the invention covered by my claims, and that certain features of my invention may sometimes be used to advantage without a corresponding use of other features.

Certain subject matter disclosed and claimed in the present application was originally disclosed and claimed in my copending application, Serial No. 478,493, filed August 28, 1930.

I claim:

1. The method of conditioning a gas which comprises passing the gas to be conditioned through a perforate mass of solids disposed between upper and lower levels, forming films of liquid on the solid surfaces flowing downwardly by gravity to the lower level, removing accretions of liquid from the lower level, and withdrawing the gas so conditioned, whereby the condition of the gas is changed with reference to the liquid, the sum of the weights of gas and liquid entering being equal to the weights of liquid and gas withdrawn, but in changed ratios.

2. The method of conditioning a gas which comprises passing the gas in through a perforate mass of solids disposed between upper and lower levels, supplying a liquid for conditioning the gas to the upper level of said mass to form films of liquid on the solid surfaces flowing downwardly by gravity to the lower level, evaporating some of the liquid of said films by heat transfer between the liquid and the gas, cooling the gas, mixing the cooled gas with the vapor generated in the gas flow spaces between said surfaces, removing accretions of unevaporated liquid from the lower level, and withdrawing the gas so conditioned.

3. The method of drying wet steam at high pressures, which comprises subjecting the wet steam to a separating action separating a portion of the moisture suspended in the steam mainly by inertia, withdrawing the separated moisture, and subsequently subjecting the steam to a second separating action separating substantially all of the remaining moisture mainly by adhesion by passing the steam through a perforate mass of solids in the steam flow path.

4. Gas conditioning apparatus comprising a casing having an inlet for gas to be conditioned and an outlet for conditioned gas, ring members progressively decreasing in effective flow area towards said outlet, each of said ring members including a porous mass of material disposed between upper and lower levels and permitting the passage of gas therethrough in intimate contact with the surfaces thereof, and means for draining accretions of liquid at the lower level of each ring member.

5. Gas conditioning apparatus comprising a cylindrical casing having an inlet for gas to be conditioned at one end and an outlet for conditioned gas at its opposite end, ring members progressively decreasing in diameter towards said outlet, each of said ring members including a porous mass of closely spaced solids disposed between upper and lower levels and permitting the passage of gas therethrough in intimate contact therewith and means for draining accretions of liquid at the lower level of each ring member.

6. Gas conditioning apparatus comprising a cylindrical casing having an inlet for gas to be conditioned at its lower end and an outlet for conditioned gas at its upper end, ring members progressively decreasing in diameter towards said outlet, each of said ring members including a porous mass of closely spaced solids disposed between upper and lower levels and permitting the passage of gas therethrough at a relatively low velocity, and means for removing accretions of liquid at the lower level of each ring member.

7. Gas conditioning apparatus comprising a casing having an inlet for wet gas at one end and an outlet for dry gas at its opposite end, ring members progressively decreasing in diameter towards said outlet, each of said ring members including a porous mass of closely spaced solids disposed between upper and lower levels and permitting the passage of gas therethrough at a relatively low velocity and in contact therewith, whereby films of separated liquid are formed on said surfaces, and means for removing accretions of separated liquid at the lower level of each ring member.

8. Gas conditioning apparatus comprising a casing having an inlet for gas to be conditioned at one end and an outlet for conditioned gas at its opposite end, ring members progressively decreasing in effective flow area towards said outlet, each of said ring members including a porous mass of material disposed between upper and lower levels and permitting the passage of gas therethrough in intimate contact with the surfaces thereof, means for supplying a conditioning liquid to the upper level of each ring member, and means for removing accretions of conditioning liquid at the lower level of each ring member.

9. A steam separator including in combination an inlet, means associated with said inlet for changing the velocity of the mixture of steam and water entering the separator, a flow reversing surface for abruptly changing the direction of flow of the stream issuing from said inlet for separating the steam and water, a second flow reversing surface for directing the body of water toward the bottom of said separator, means for preventing the water being thrown upward from said bottom, a steam offtake above said reversing surfaces and a porous water collecting body located in the path of flow between said surfaces and said outlet.

CHARLES E. LUCKE.